June 2, 1970  ZENJI KUSUDA ET AL  3,514,968
ELECTRIC REFRIGERATOR WITH COMPRESSOR CONTROL
Filed Aug. 27, 1968  2 Sheets-Sheet 1

INVENTORS
ZENJI KUSUDA,
TAKEJI KOBAYASHI
BY
ATTORNEYS

United States Patent Office 3,514,968
Patented June 2, 1970

3,514,968
ELECTRIC REFRIGERATOR WITH
COMPRESSOR CONTROL
Zenji Kusuda, Ibaragi-shi, and Takeji Kobayashi, Kyoto, Japan, assignors to Matsushita Electronics Corporation, Osaka, Japan, a corporation of Japan
Filed Aug. 27, 1968, Ser. No. 755,668
Claims priority, application Japan, Aug. 31, 1967 (utility models), 42/75,173, 42/75,174, 42/75,175
Int. Cl. F25b 1/00
U.S. Cl. 62—227      3 Claims

ABSTRACT OF THE DISCLOSURE

An electric refrigerator having an electronic temperature controller which is sensitive to the temperature within the apparatus so as to selectively energize the heater disposed within the apparatus as well as the compressor motor thereby to continuously maintain the optimum temperature within the apparatus, and having means for protecting the compressor motor from undesirable overload, thereby ensuring excellent refrigerating performance and a high degree of safety.

This invention relates to electric refrigerators, and more particularly to a temperature controller for use in such apparatus.

In known electric refrigerators, a thermistor, for example, is used as a temperature detector for the temperature control of the apparatus. The temperature control has been effected by incorporating the thermistor as an element of a balanced circuit, that is, a bridge, detecting an unbalanced current generated when the balanced circuit is placed in its unbalanced state due to a variation in the temperature of a portion whose temperature is to be controlled, amplifying the unbalanced current to a level high enough to drive a relay, and energizing or deenergizing the relay to stop or start the operation of the freezer thereby maintaining the temperature within the refrigerator at a predetermined setting. The temperature controller having such a system has been defective because of the complexity of circuitry, the tendency of the hysteresis characteristics of the relay toward fluctuation, and the short service life of the relay due to liability of the relay contacts to quick wear.

Furthermore, in the temperature controller based on such a system, the circuit for power supply to the compressor motor is merely opened and closed as required to control the temperature within the refrigerator. Because of such an arrangement, the electric refrigerator is not suitable for operation in an area where the ambient temperature is extremely low. More precisely, when the temperature within the refrigerator is reduced to a certain predetermined value and the compressor motor ceases to operate, the temperature within the refrigerator balances with the ambient temperature and cannot rise to the value which is required to start the compressor motor again. The above difficulty results in a very undesirable situation namely articles contained within the refrigerator are completely frozen.

Some of the known electric refrigerators are equipped with means for preventing the compressor motor from being damaged due to so-called burning which results from generation of heat in the compressor motor when it is heavily overloaded. The protective means which commonly employs a bimetal is not always satisfactory in every respect because it has a slow speed of response, has a poor sensitivity and is liable to wear at the contacts.

With a view to overcome such defects involved in known electric refrigerators, it is a first object of the present invention to provide an electric refrigerator which is provided with a temperature controller having a simplified circuitry.

A second object of the present invention is to provide an electric refrigerator whose internal temperature can vary accurately be controlled.

A third object of the present invention is to provide an electric refrigerator which is substantially free of trouble because of the fact that all the mechanical contacts are eliminated.

A fourth object of the present invention is to provide an electric refrigerator or like apparatus which can preserve a predetermined temperature therewithin even if the ambient temperature is extremely low.

A fifth object of the present invention is to provide an electric refrigerator which is provided with means for positively preventing undesirable burning of the compressor motor.

In accordance with the present invention, there is provided an electric refrigerator having a compressor motor which compresses a refrigerant for effecting the refrigerating operation, comprising a thyristor connected in series with said compressor motor, a Schmitt trigger circuit having means for detecting the temperature within the apparatus, and means for triggering said thyristor, wherein the outut terminal of said Schmitt trigger circuit is connected through said trigger means with the gate electrode of said thyristor, and said thyristor is selectively urged to its conducting state and to its cutoff state by the operation of said Schmitt trigger circuit depending on a variation in temperature within the apparatus thereby selectively supplying power to said compressor motor.

The above and other objects, features and advantages of the present invention will be readily apparent from the following detailed description of a preferred embodiment thereof taken in conjunction with the accompanying drawings, in which.

Figure 1:
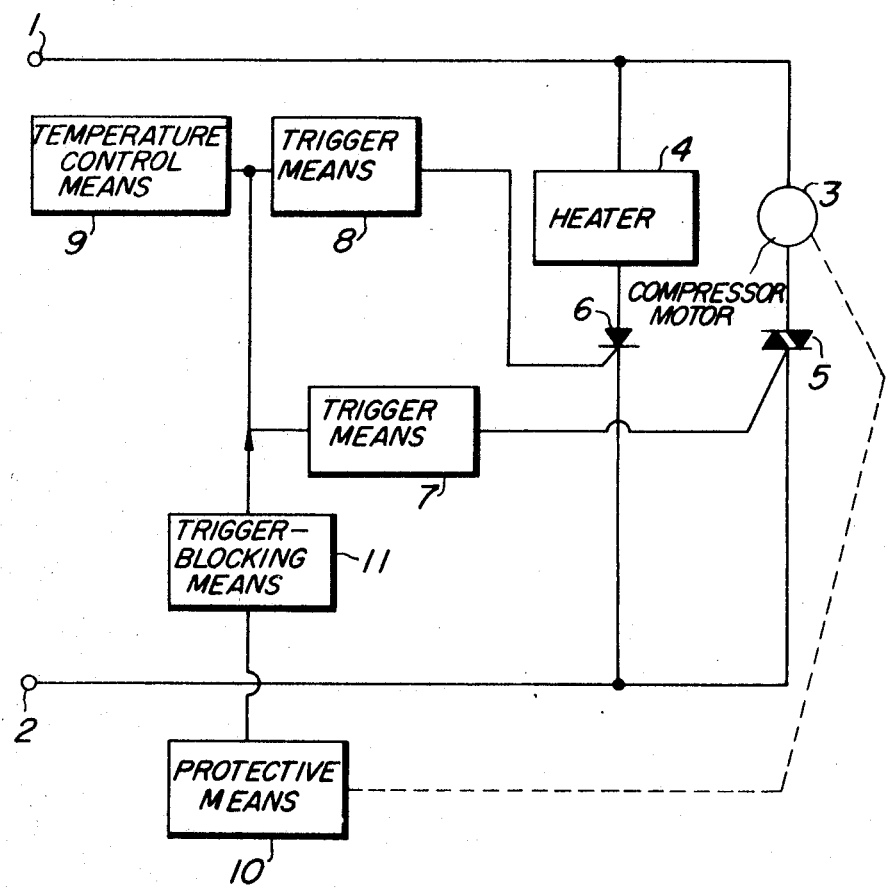
FIG. 1 is a block diagram of a temperature controller employed in an electric refrigerator according to the present invention.

Referring to FIG. 1 showing in block diagram the structure of the temperature controller which attains the above-described objects of the present invention, a compressor motor 3 is connected across power source terminals 1 and 2. A heater 4 is adapted to be energized when the compressor motor 3 ceases its operation. A first thyristor 5 controls the power supply to the compressor motor 3, while a second thyristor 6 controls the power supply to the heater 4. A first trigger means 7 is associated with the first thyristor 5 for triggering the same, while a second trigger means 8 is associated with the second thyristor 6 for triggering the same. A temperature control means 9 is associated with the first and second trigger means 7 and 8 for controlling the operation of these trigger means. A protective means 10 has such an operating characteristic that its operating condition is variable depending on the temperature of the compressor motor 3. The protective means 10 is connected with a trigger-blocking means 11 so as to actuate the latter as required. The trigger blocking means 11 when so actuated is operative to forcedly block the triggering action on the first thyristor 5.

Figure 2:
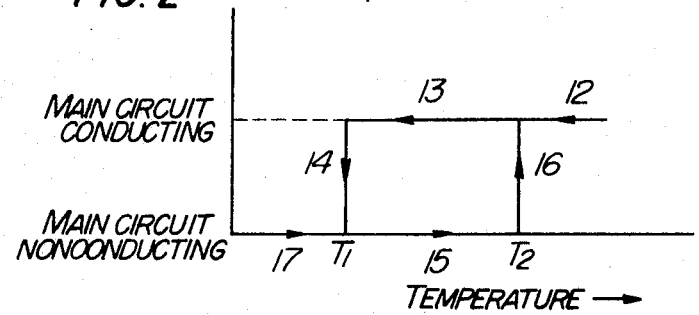
FIG. 2 is a diagrammatic view illustrating the control operation of the temperature controller shown in FIG. 1.

An apparatus such as an electric refrigerator provided with the temperature controller having such a structure operates in a manner as shown in FIG. 2. When the temperature within the refrigerator becomes higher than an upper limit $T_2$, the first trigger means 7 is actuated by the temperature control means 9 to urge the first thyristor 5 to conduct and thereby to start the compressor motor 3. By the operation of the compressor motor 3, the temperature within the refrigerator goes down along a path 12 and then a path 13. When the temperature within the refrigerator is lowered to a lower limit $T_1$, the control operation is reversed to urge the first thyristor 5 to its cutoff state thereby stopping the operation of the compressor motor 3. As soon as the compressor motor 3 ceases its operation, the heater 4 is energized because of the fact that the second trigger means 8 urges the second thyristor 6 to conduct. As a result, the temperature within the refrigerator goes up gradually along a path 14 and then a path 15. When the temperature within the refrigerator goes again up to the upper limit $T_2$, the state of the thyristors 5 and 6 is reversed again so that the temperature within the refrigerator goes down again along a path 16.

When, on the other hand, the temperature within the refrigerator at the beginning of the refrigerating operation is lower than the lower limit $T_1$, the thyristor 5 is kept in its cutoff state and the thyristor 6 is urged to conduct to energize the heater 4 whereby the temperature within the refrigerator goes up along a path 17 and then the path 15. After the temperature within the refrigerator has reached the upper limit $T_2$ in this manner, an operation entirely the same as the above operation is repeated to maintain the temperature within the predetermined range.

During the above type of operation, an unusual condition might develop in the compressor motor 3 thereby generating heat in the motor itself. In other words, heat may be generated in the compressor motor itself thereby giving rise to trouble by burning when the ambient temperature is so high that rotation of the compressor motor cannot reduce the temperature within the refrigerator beyond a certain fixed value or when a heavy load is imparted to the compressor motor. In such a case, the protective means 10 immediately detects the above situation and actuates the trigger-blocking means 11 to forcedly block the triggering of the thyristor 5. The power supply to the compressor motor 3 is thereby interrupted and the compressor motor 3 is protected against damage by burning.

Figure 3:
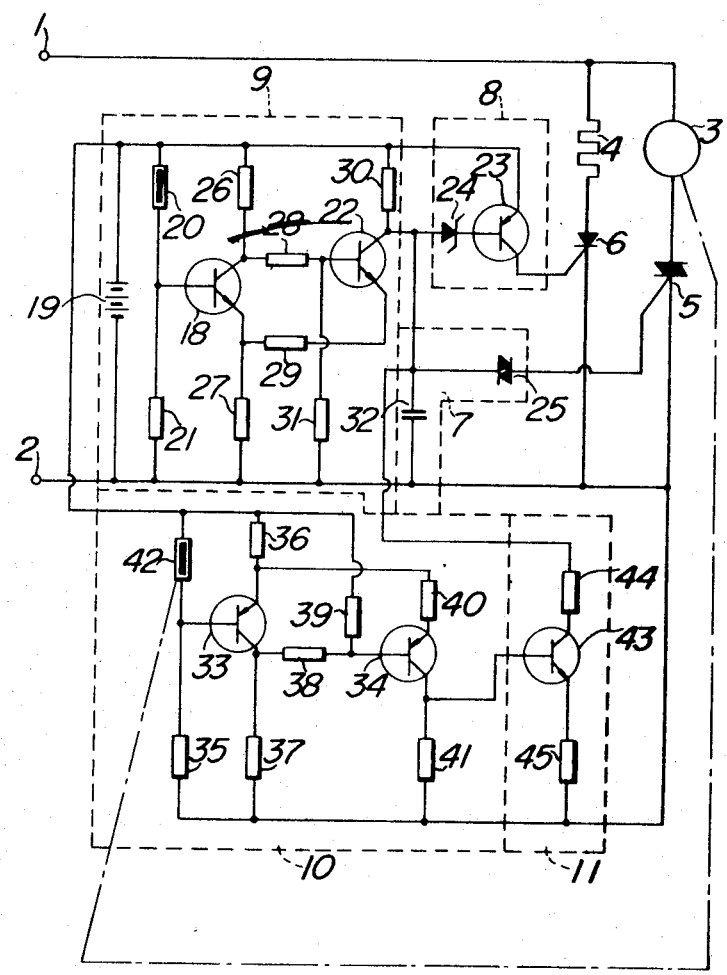
FIG. 3 is a practical circuit diagram of the temperature controller shown in FIG. 1.

The operation of the temperature controller described above will be described in more detail with reference to FIG. 3. In the circuit shown in FIG. 3, the compressor motor 3 is connected in series with the first thyristor 5, and the heater 4 is connected in series with the second thyristor 6. The temperature control means 9 comprises two transistors 18 and 22. The base of the transistor 18 is connected with the common terminal of a thermistor 20 and a resistor 21 which are connected across a D.C. power supply or battery 19. The collector of the transistor 22 is connected with the base of a switching transistor 23 through a Zener diode 24.

The Zener diode 24 is operative in preventing the transistor 23 from making an erroneous operation. A bilateral switching device 25 having a negative resistance is used to further connect the collector of the transistor 22 with the gate electrode of the thyristor 5 which is connected in series with the compressor motor 3. The collector of the transistor 23 is connected with the gate electrode of the thyristor 6 which is connected in series with the heater 4. The transistors 18 and 22 in the temperature control means 9 constitute a Schmitt trigger circuit together with resistors 26, 27, 28, 29, 30 and 31.

When the temperature within the refrigerator rises up to the upper limit $T_2$, the resistance of the thermistor 20 disposed in the circuit of the structure described above is reduced and the transistor 18 is deeply biased across its base and emitter. The circuit constants are so determined that the transistor 18 is urged to conduct when biased with the above bias voltage. Thus, the transistor 18 so biased is placed in its conducting state and its collector voltage is extremely reduced. This results in a reduction of the base voltage of the transistor 22 which is thereby urged to its cutoff state. Accordingly, a capacitor 32 is charged by the voltage supplied from the D.C. power supply 19 through the resistor 30. As soon as the capacitor 32 is charged to the conducting voltage of the bilateral switching device 25 having the negative resistance, the bilateral switching device 25 is urged to conduct to apply a trigger pulse to the gate electrode of the thyristor 5. The thyristor 5 conducts in response to the arrival of the trigger pulse. The electric charge accumulated within the capacitor 32 is discharged in the course of the above operation, but the capacitor 32 is re-charged thereafter.

The capacitor 32 is repeatedly charged and discharged while the transistor 18 is kept in its cutoff state so as to successively apply the trigger pulses to the gate electrode of the thyristor 5, and the current flows through the main circuit including the compressor motor 3 and the thyristor 5 thereby to drive the compressor motor 3 and to continue the refrigerating operation. As the temperature within the refrigerator goes down by the operation of the compressor motor 3 in this manner, the resistance of the thermistor 20 disposed within the refrigerator increases gradually while the base bias voltage applied to the transistor 18 is gradually reduced until finally the transistor 18 is urged to its cutoff state. As a result, the transistor 22 is now urged to its conducting state and the trigger pulse applied to the thyristor 5 is thereby ceased. However, the conduction of the transistor 22 is followed by application of a deep base bias to the transistor 23, which is thereby urged to conduct to trigger the thyristor 6. The thyristor 6 is now placed in its conducting state and the heater 4 is energized.

It will be understood that the control operation is such that the compressor motor 3 is energized when the temperature within the refrigerator exceeds the upper limit, while the heater 4 is energized when the temperature within the refrigerator is reduced below the lower limit, and thus the temperature within the refrigerator can always be maintained within the present temperature range irrespective of the ambient temperature. By virtue of the above type of operation, trouble such as freezing of ordinary foods and the like contained within the refrigerator due to reduction in the ambient temperature does not occur.

Furthermore, in case an unusual condition should develop in the compressor motor giving rise to generation of heat while the control operation described above is being performed, the protective means 10 and the trigger-blocking means 11 operate in a manner as described hereinunder to immediately interrupt the power supply to the compressor motor 3 thereby to protect the same from damage. More precisely, the protective means 10 comprises a Schmitt trigger circuit formed by transistors 33 and 34, resistors 35, 36, 37, 38, 39, 40 and 41, and a thermistor 42 thermally coupled to the compressor motor 3. The transistor 34 in the protective means 10 has its collector connected to the base of a switching transistor 43 which is the principal component of the trigger-blocking means 11. The switching transistor 43 has its collector connected with the collector of the transistor 22 through a resistor 44 and its emitter connected with ground through a resistor 45.

In case an unusual condition should develop in the compressor motor 3 which is thereby heated to a high temperature, the resistance of the thermistor 42 thermally coupled to the compressor motor 3 makes an abrupt decrease, urging the transistor 33 to its cutoff state and the transistor 34 to its conducting state. As a result, the transistor 43 is also urged to its conducting state and the opposite plates of the capacitor 32 are substantially short-circuited by the conducting transistor 43. Therefore, even if a relatively high temperature prevails within the refrigerator and the transistor 22 is in its cutoff state, conduction of the bilateral switching device 25 and the resultant triggering of the gate of the thyristor 5 by the bilateral switching device 25, hence the conduction of the thyristor 5 is forcedly blocked to interrupt the power supply to the compressor motor 3.

As soon as the compressor motor 3 ceases to generate heat and the resistance of the thermistor 42 increases again, the state of the Schmitt trigger circuit constituting the protective means 10 is inverted from the above state so that the switching transistor 43 is urged to its cutoff state to release the trigger-blocking effort. In this manner, protection for the compressor motor 3 can very quickly and accurately be effected.

It will be appreciated from the foregoing description that the electric refrigerator according to the present invention has many excellent advantages over conventional ones.

What is claimed is:

1. An electric refrigerator having a compressor motor which compresses a refrigerant for effecting the refrigerating operation, comprising a thyristor connected in series with said compressor motor, a Schmitt trigger circuit having means for detecting the temperature within the apparatus, and means for triggering said thyristor, wherein the output terminal of said Schmitt trigger circuit is connected through said trigger means with the gate electrode of said thyristor, and said thyristor is selectively urged to its conducting state and to its cutoff state by the operation of said Schmitt trigger circuit depending on a variation in the temperature within the apparatus thereby selectively supplying power to said compressor motor.

2. An electric refrigerator according to claim 1, further comprising series connection of a heater and a second thyristor connected in parallel with the series connection of said compressor motor and said first thyristor, and second trigger means connected with the gate electrode of said second thyristor so as to energize and deenergize said second thyristor in response to deenergization and energization of said first thyristor connected with said compressor motor, said second trigger means being connected with the output terminal of said Schmitt trigger circuit having means for detecting the temperature within the apparatus so that said second trigger means can be actuated by the output of said Schmitt trigger circuit.

3. An electric refrigerator according to claim 1, further comprising a switching transistor connected between a grounded terminal and the output terminal of said Schmitt circuit having means for detecting the temperature within the apparatus, and a second Schmitt circuit having means for detecting the temperature of said compressor motor, said second Schmitt circuit having its output terminal connected to the base of said switching transistor so that said switching transistor can be urged to its conducting state by the output of said second Schmitt circuit and said thyristor connected in series with said compressor motor can thereby be forcedly urged to its cutoff state.

References Cited

UNITED STATES PATENTS 3,363,429  1/1968  Wechsler _____ 62—140

MEYER PERLIN, Primary Examiner

U.S. Cl. X.R.

62—202, 228; 165—26